W. F. SCHWIESOW.
GASOLENE TANK.
APPLICATION FILED FEB. 9, 1911.
994,793.
Patented June 13, 1911.
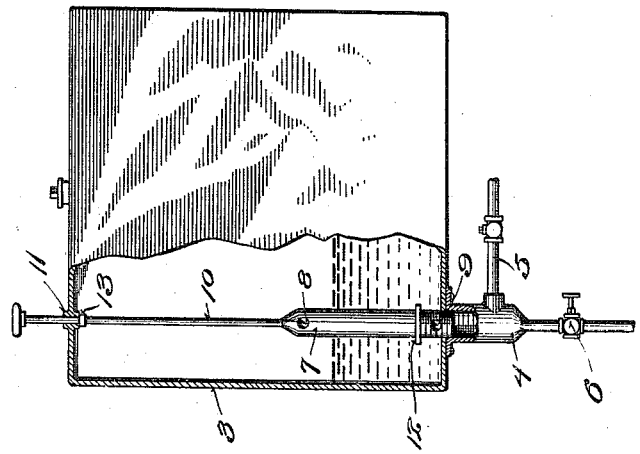
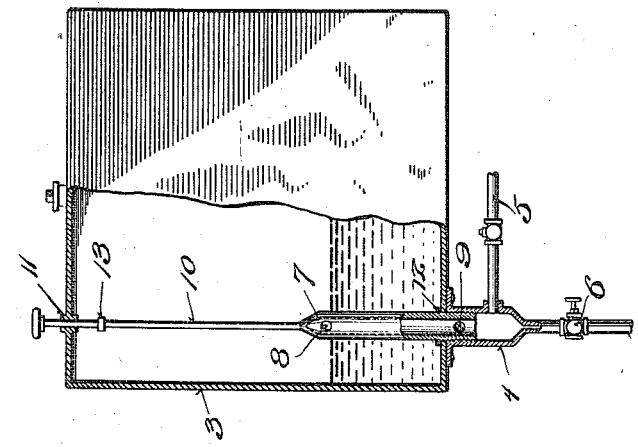

UNITED STATES PATENT OFFICE.

WILLIAM F. SCHWIESOW, OF RIPON, WISCONSIN.

GASOLENE-TANK.

994,793.

Specification of Letters Patent. Patented June 13, 1911.

Application filed February 9, 1911. Serial No. 607,686.

*To all whom it may concern:*

Be it known that I, WILLIAM F. SCHWIESOW, a citizen of the United States, and resident of Ripon, in the county of Fond du Lac and State of Wisconsin, have invented certain new and useful Improvements in Gasolene-Tanks; and I do hereby declare that the following is a full, clear, and exact description thereof.

My invention consists in what is herein particularly set forth with reference to the accompanying drawings and pointed out in the claims of this specification, its object being to provide gasolene tanks with means by which to limit the feed of their contents to a predetermined depth, as a reminder that replenishment is necessary, and to thereafter permit feed of the remaining contents if desirable, said invention having especial reference to the fuel tanks of gasolene engines for automobiles and otherwise.

Figure 1 of the drawings represents an elevation of a gasolene tank partly broken away and provided with an adjustable device illustrated as set to limit feed of the contents of the tank to a predetermined depth, and Fig. 2, a similar view illustrating said device adjusted to permit feed of the remaining contents of said tank.

Referring by numerals to the drawings, 3 indicates an ordinary gasolene tank, 4 a nozzle-fitting attached to the bottom of the tank to depend therefrom, 5 a cock-controlled feed-pipe coupled to the nozzle-fitting, and 6 a cock controlling a drain-extension of said fitting.

Extending through an aperture in the tank bottom and having screw-threaded engagement with the fitting aforesaid is a hollow plug 7 provided with upper and lower apertures 8, 9, a stem 10 of the plug being extended through a bearing 11 with which the top of said tank is provided. The adjustment of the plug is limited in one direction by a flange 12 thereof in opposition to the bottom of the tank, and in the opposite direction by a stem-collar 13 opposed to the top of said tank. When the plug 7 is adjusted to the position shown in Fig. 1, the contents of the tank may feed through the top aperture 8 of said plug to the predetermined depth indicated. The feed being automatically discontinued, the contents of the tank may be replenished if a supply of gasolene is at hand, otherwise, the plug 7 is adjusted to bring its lower aperture into position to permit flow of the remaining contents of said tank, the same being ordinarily sufficient to last an automobile driver for several miles, thereby giving him opportunity to run on to where he may again fill the aforesaid tank with gasolene.

I claim:

1. A gasolene tank provided with a nozzle-fitting connected to a feed-pipe, a hollow feed-control plug having screw-thread engagement with the fitting and extending into the tank, said plug being apertured adjacent to both ends of the same, and a stem extending from the plug through a bearing with which the tank is provided.

2. A gasolene tank provided with a nozzle-fitting connected to a feed-pipe, a hollow feed-control plug having screw-thread engagement with the fitting and extending into the tank, said plug being apertured adjacent to both ends of the same, a stem extending from the plug through a bearing with which the tank is provided, and means in connection with said plug and stem for limiting the adjustment of the same in opposite directions.

3. A gasolene tank provided with a nozzle-fitting connected to a feed-pipe, a hollow feed-control plug having screw-thread engagement with the fitting and extending into the tank, said plug being apertured adjacent to both ends of the same, a stem extending from the plug through a bearing with which the tank is provided, a stop-flange on said plug, and a stop-collar on the stem.

In testimony that I claim the foregoing I have hereunto set my hand at Ripon in the county of Fon du Lac and State of Wisconsin in the presence of two witnesses.

WILLIAM F. SCHWIESOW.

Witnesses:
H. M. OLDER,
G. A. T. WEAVER.